US012643424B2

(12) United States Patent
    Gokhale et al.

(10) Patent No.:    US 12,643,424 B2
(45) Date of Patent:       Jun. 2, 2026

(54) POWER ARRANGEMENT, METHOD FOR PROVIDING ELECTRICAL POWER AND COMPUTER PROGRAM PRODUCT

(71) Applicant: EATON INTELLIGENT POWER LIMITED, Dublin (IE)

(72) Inventors: Manoj Gokhale, Pune (IN); Sachin Umbarkar, Ahmednagar (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 447 days.

(21) Appl. No.: 18/255,031

(22) PCT Filed: Nov. 30, 2021

(86) PCT No.: PCT/EP2021/083642
§ 371 (c)(1),
(2) Date: May 30, 2023

(87) PCT Pub. No.: WO2022/117587
PCT Pub. Date: Jun. 9, 2022

(65) Prior Publication Data
US 2024/0001794 A1     Jan. 4, 2024

(30) Foreign Application Priority Data

Dec. 1, 2020    (IN)  ............................. 202011052272
Feb. 15, 2021    (GB)  ..................................... 2102113

(51) Int. Cl.
    B60L 53/63      (2019.01)
    H02J 3/00      (2006.01)
            (Continued)

(52) U.S. Cl.
    CPC ................ B60L 53/63 (2019.02); H02J 3/00 (2013.01); B60L 55/00 (2019.02); H02J 2105/12 (2026.01)

(58) Field of Classification Search
    CPC .......... B60L 53/63; B60L 55/00; B60L 53/67; B60L 53/68; B60L 2240/80; H02J 3/00;
                 (Continued)

(56) References Cited

U.S. PATENT DOCUMENTS 8,103,386 B2    1/2012   Ichikawa et al.
2015/0054466 A1*   2/2015   Kinomura ............... B60L 58/13
                                  320/134

(Continued)

FOREIGN PATENT DOCUMENTS

KR      2019 0037624 A    4/2019
WO      2019/141511 A1    7/2019

*Primary Examiner* — Mohammad Ali
*Assistant Examiner* — Sheela Rao
(74) *Attorney, Agent, or Firm* — LEYDIG, VOIT & MAYER, LTD.

(57) ABSTRACT

A power arrangement comprises an energy management arrangement, a demand interface circuit, a power distribution arrangement, a vehicle power terminal and a building power terminal. The demand interface circuit acquires at least one demand data of a group comprising: an energy need that is required of an electric vehicle, a discharge energy that is available by the electric vehicle for discharging, a charging time period that is available for charging the electric vehicle and a discharging time period that is available for discharging the electric vehicle. The energy management arrangement controls the power distribution arrangement such that vehicle electrical power is provided at the vehicle power terminal as a function of the demand data and building electrical power is provided at the building power terminal.

19 Claims, 4 Drawing Sheets

(51) Int. Cl.
　　*B60L 55/00*　　　　(2019.01)
　　*H02J 105/12*　　　(2026.01)
(58) Field of Classification Search
　　CPC ....... H02J 2310/12; H02J 3/322; Y02T 10/70;
　　　　　　Y02T 10/7072; Y02T 90/12; Y04S 30/12
　　See application file for complete search history.

(56) References Cited

U.S. PATENT DOCUMENTS

2017/0259683　A1　　9/2017　Shimizu et al.
2021/0057927　A1*　2/2021　Kazuno ................... H02J 9/002

* cited by examiner

FIG 2A

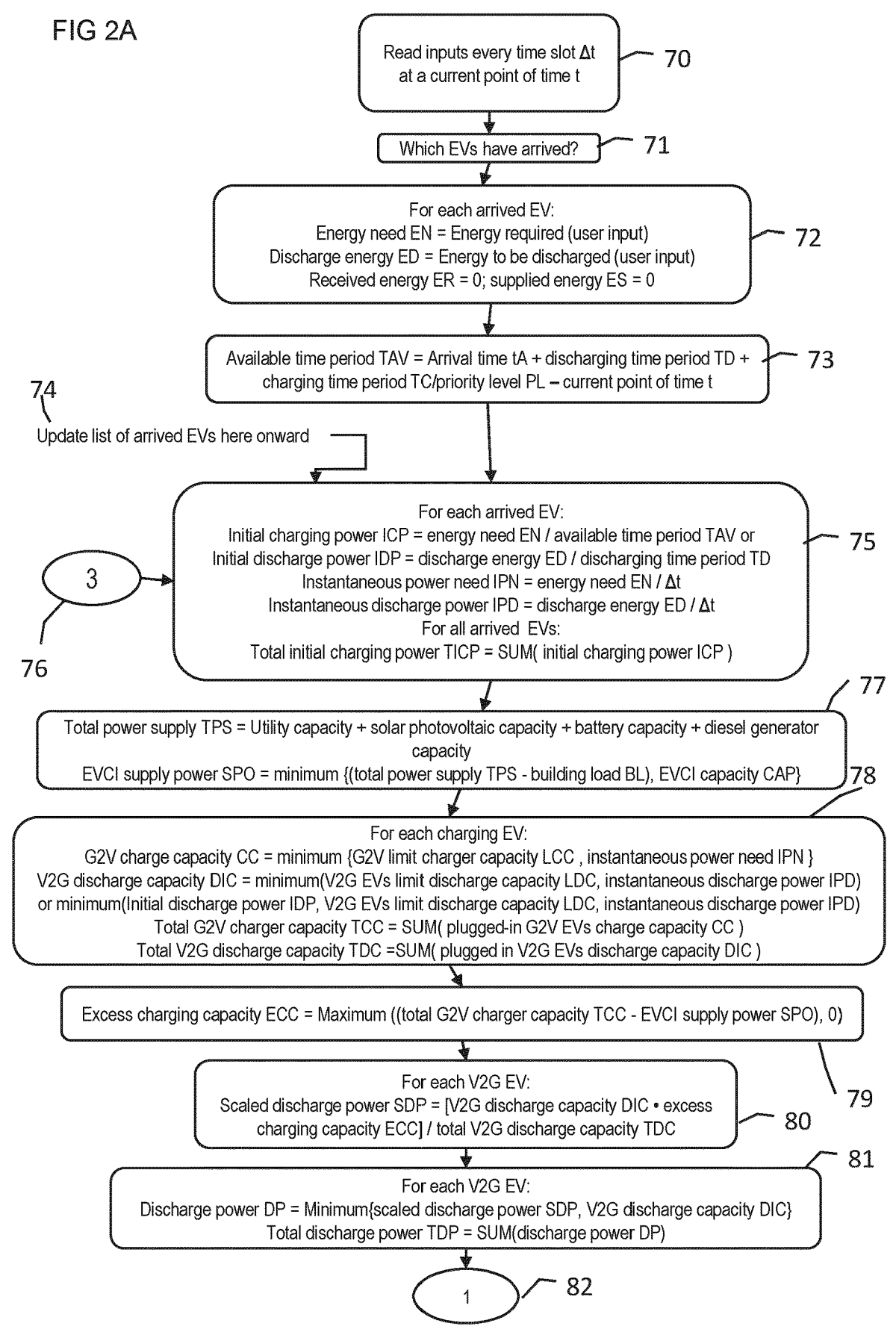

Read inputs every time slot Δt
at a current point of time t — 70

Which EVs have arrived? — 71

For each arrived EV:
Energy need EN = Energy required (user input)
Discharge energy ED = Energy to be discharged (user input)
Received energy ER = 0; supplied energy ES = 0 — 72

Available time period TAV = Arrival time tA + discharging time period TD +
charging time period TC/priority level PL − current point of time t — 73

74

Update list of arrived EVs here onward

For each arrived EV:
Initial charging power ICP = energy need EN / available time period TAV or
Initial discharge power IDP = discharge energy ED / discharging time period TD
Instantaneous power need IPN = energy need EN / Δt
Instantaneous discharge power IPD = discharge energy ED / Δt
For all arrived  EVs:
Total initial charging power TICP = SUM( initial charging power ICP ) — 75

3

76

Total power supply TPS = Utility capacity + solar photovoltaic capacity + battery capacity + diesel generator
capacity
EVCI supply power SPO = minimum {(total power supply TPS - building load BL), EVCI capacity CAP} — 77

78

For each charging EV:
G2V charge capacity CC = minimum {G2V limit charger capacity LCC , instantaneous power need IPN }
V2G discharge capacity DIC = minimum(V2G EVs limit discharge capacity LDC, instantaneous discharge power IPD)
or minimum(Initial discharge power IDP, V2G EVs limit discharge capacity LDC, instantaneous discharge power IPD)
Total G2V charger capacity TCC = SUM( plugged-in G2V EVs charge capacity CC )
Total V2G discharge capacity TDC =SUM( plugged in V2G EVs discharge capacity DIC )

Excess charging capacity ECC = Maximum ((total G2V charger capacity TCC - EVCI supply power SPO), 0)

79

For each V2G EV:
Scaled discharge power SDP = [V2G discharge capacity DIC • excess
charging capacity ECC] / total V2G discharge capacity TDC — 80

81

For each V2G EV:
Discharge power DP = Minimum{scaled discharge power SDP, V2G discharge capacity DIC}
Total discharge power TDP = SUM(discharge power DP)

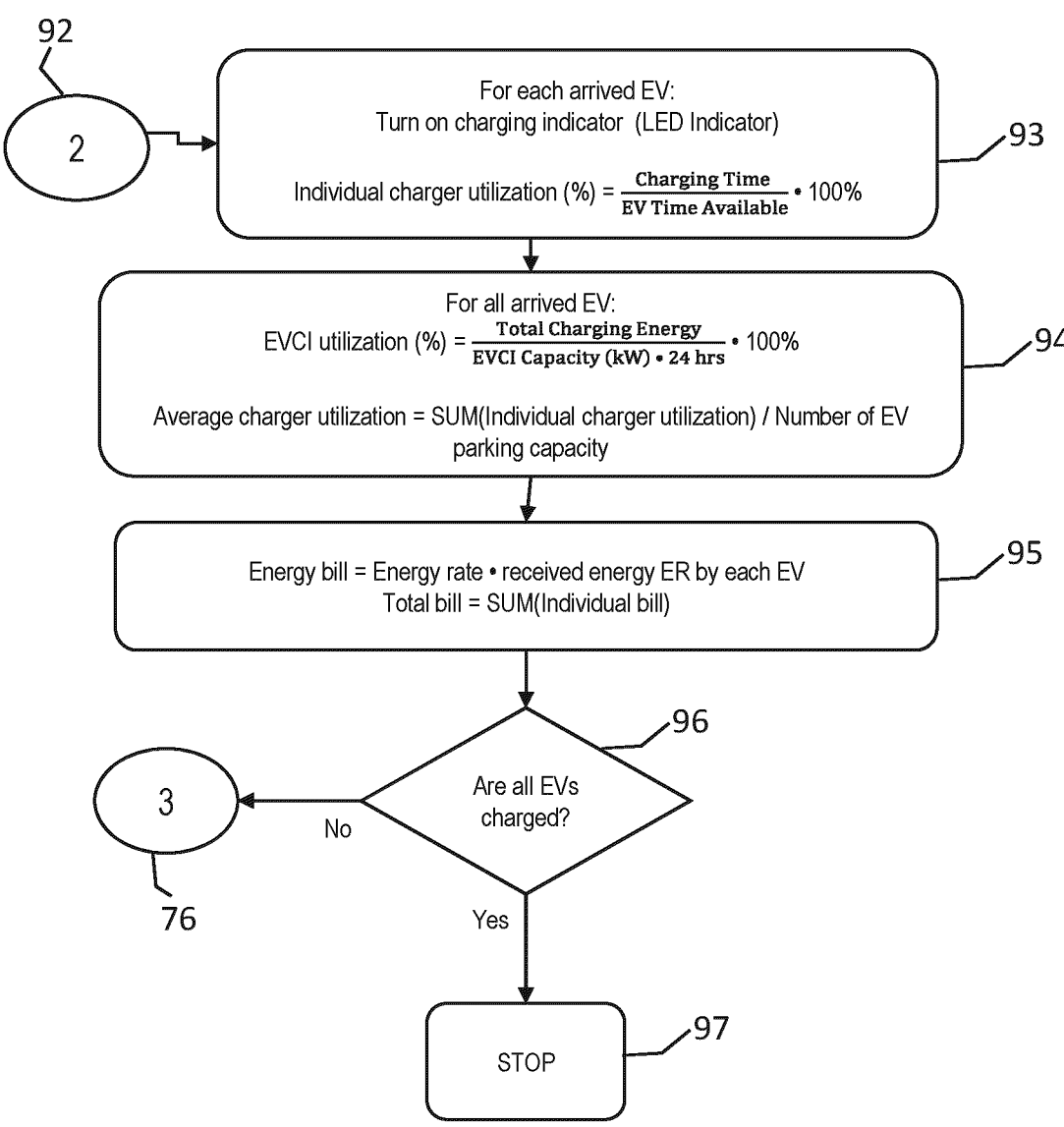

92

2

For each arrived EV:
Turn on charging indicator (LED Indicator)

$$\text{Individual charger utilization (\%)} = \frac{\text{Charging Time}}{\text{EV Time Available}} \cdot 100\%$$

93

For all arrived EV:

$$\text{EVCI utilization (\%)} = \frac{\text{Total Charging Energy}}{\text{EVCI Capacity (kW)} \cdot 24 \text{ hrs}} \cdot 100\%$$

Average charger utilization = SUM(Individual charger utilization) / Number of EV parking capacity

94

Energy bill = Energy rate • received energy ER by each EV
Total bill = SUM(Individual bill)

95

Are all EVs charged?

96

3

76

No

Yes

STOP

97

POWER ARRANGEMENT, METHOD FOR PROVIDING ELECTRICAL POWER AND COMPUTER PROGRAM PRODUCT

CROSS REFERENCE TO RELATED APPLICATIONS

This application is a U.S. National Phase application under 35 U.S.C. § 371 of International Application No. PCT/EP2021/083642, filed on Nov. 30, 2021, and claims benefit to Indian Patent Application number 202011052272, filed on Dec. 1, 2020, and United Kingdom Patent Application No. 2102113.4 filed on Feb. 15, 2021. The International Application was published in English on Jun. 9, 2022, as WO 2022/117587 A1 under PCT Article 21(2).

FIELD

The disclosure is related to a power arrangement, a method for providing electrical power, and a computer program product.

BACKGROUND

A power arrangement can have different sources of electrical power such as, for example, a utility grid. The power arrangement provides electrical power to a consumer such as a charger for an electrical vehicle, or to more than one consumer such as a number N of chargers for electrical vehicles. The power arrangement provides a method for providing electrical power using electrical power supplied at a supply side and aiming at fulfilling demands on a consumer side.

Document WO 2019/141511 A1 describes a system and method for managing energy distribution using a distributed ledger. Energy producers or suppliers are coupled via a decentralized distributed ledger network to a plurality of consumer energy loads. Energy suppliers include traditional suppliers of electricity such as, for example, utilities that supply energy using fossil fuels and more contemporary energy producers such as distributed energy resources, for example wind, solar photovoltaic, hydroelectric and battery storage systems. Consumer loads are residential, commercial or industrial loads. A residence is connected to a transmission and distribution grid and the distributed ledger network.

Document US 2017/0259683 A1 describes a system and method for charging and discharging a Plug-in Electric Vehicle (PEV). An optimization system includes code and routines which, when executed by a processor, cause the processor to perform one or more of the following steps: estimating a next journey that the PEV will take; estimating a departure time when the next journey will start; estimating a journey power value describing how much wattage the PEV will consume to complete the next journey; determining a PEV power value describing how much wattage the battery system is currently storing; calculating a charge time occurring between an end of a demand response event and the departure time; estimating a charge time power value describing how much wattage can be stored in the battery system during the charge time; and determining a maximum discharge value that is a maximum amount of wattage discharged by the battery system of the PEV to the power grid during the demand response event. The discharging to the power grid may be limited by the optimization system to the maximum discharge value.

SUMMARY

An aspect of the present disclosure provides a system to provide electrical power to an electrical vehicle. The system includes an energy manager; a demand circuitry coupled to the energy manager. The demand circuitry is configured to acquire demand data including an energy need of the electric vehicle, a discharge energy that is available by the electric vehicle for discharging, a discharging time period that is available for discharging the electric vehicle, and a charging time period that is a maximum period which can be used for charging the energy need into the electric vehicle. A power distributor having a first outlet and a second outlet is coupled to the energy manager. A vehicle power outlet is coupled to the first outlet of the power distributor, and a building power outlet coupled to the second outlet of the power distributor. The energy manager has a processor to: calculate an available time period for the electric vehicle at a current point of time (t) according to a following equation: $TAV=tA+TD+TC/PL-t$, wherein $tA$ is a value of an arrival time of the electric vehicle, $TD$ is a value of the discharging time period, $TC$ is a value of the charging time period, $PL$ is a priority level with $PL \geq 1$, and t is the current point of time. The processor of the energy manager further calculates a charging power as a ratio of the energy need of the electric vehicle to the available time period, determines a discharge power as a function of the discharge energy and the discharging time period, provides vehicle electrical power at the vehicle power outlet, via the power distributor, based on the demand data acquired by the demand circuitry, and provides building electrical power, via the power distributor, at the building power outlet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 2A to 2C show an exemplary embodiment of a method performed by a power arrangement, according to one or more embodiments of the present disclosure.

DETAILED DESCRIPTION

Figure 1:
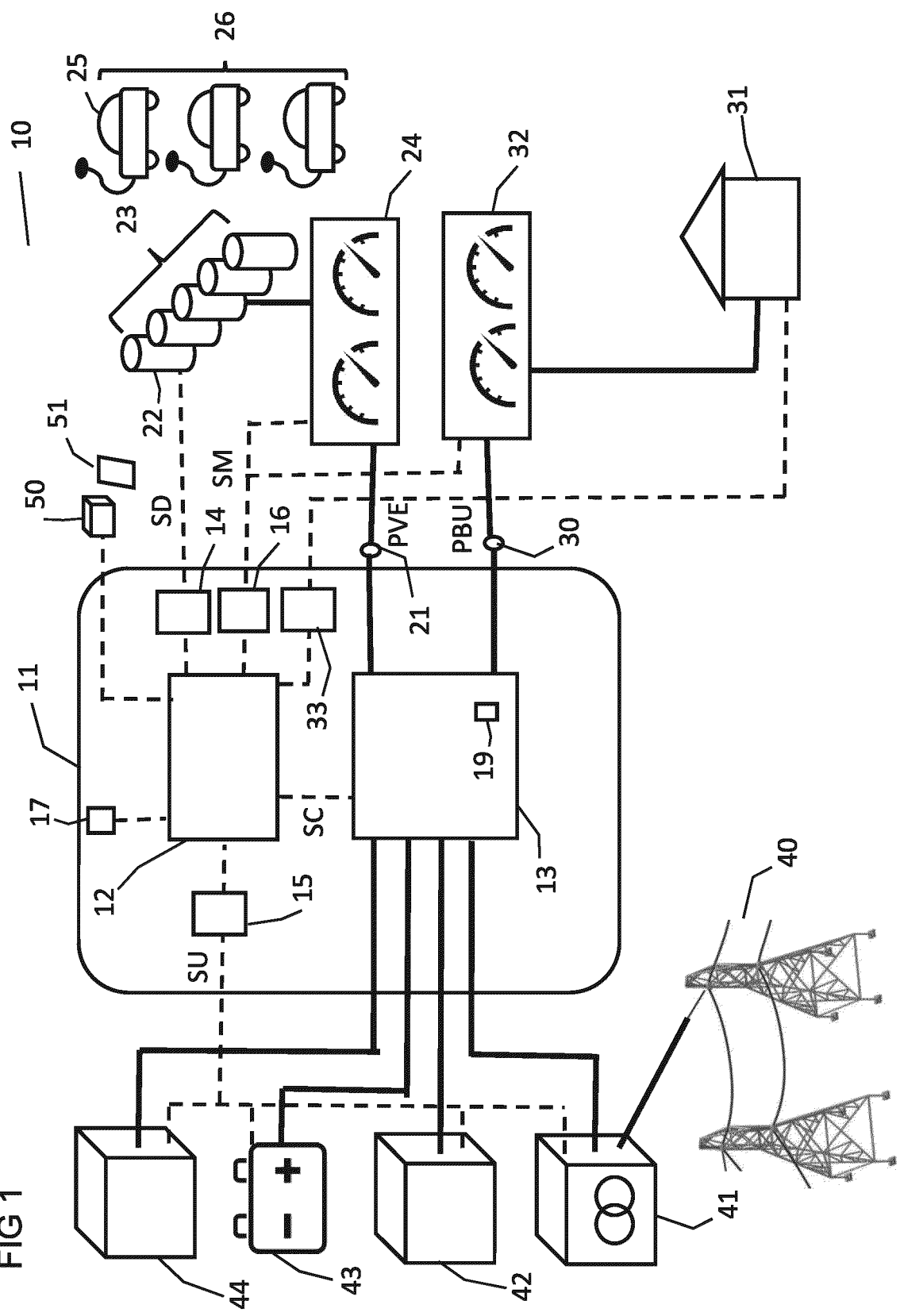
FIG. 1 shows an exemplary embodiment of an arrangement with a power arrangement, according to one or more embodiments of the present disclosure.

In accordance with aspects of the present disclosure, a power arrangement, a method for providing electrical power, and a computer program product that improve the supply of electrical power to a load are provided. The load may be, for example, that of at least one electric vehicle and a building.

According to one aspect, a power arrangement is provided which comprises an energy management arrangement, a demand interface circuit coupled to the energy management arrangement, a power distribution arrangement coupled to the energy management arrangement, a vehicle power terminal coupled to the power distribution arrangement and a building power terminal coupled to the power distribution arrangement.

In preferred embodiments, the power arrangement of the present disclosure optimizes the electrical power available and the time periods available to charge at least one electric vehicle and to provide electrical power to a building arrangement. For example, in a particularly preferred embodiment, the power arrangement may implement a system and methodology for EV fleet charging at a building.

A fleet of EVs may need to charge themselves using a fleet charging system. This system is often sized for the worst-case scenario, i.e. when all EVs are plugged-in and are drawing maximum power as per the EV charger rating. This requires huge power capacity for the charging infrastructure, leading to huge installation, operational and maintenance costs. The power arrangement described herein avoids these draw backs.

In a development of a preferred embodiment supporting EV fleet charging, the power arrangement of the present disclosure uses a power distribution algorithm for an electric vehicle charging infrastructure. The EV fleet charging infrastructure should meet daily EV charging needs in desired time. The power distribution algorithm in the energy management system can be used to distribute power across the plugged-in EVs to meet their daily charging need within the desired time duration while minimizing the installed power supply and EV charging capacity. The algorithm also leverages the vehicle-to-grid capability of certain vehicles to minimize the overall fleet charging duration and peak-demand expense. The power arrangement maximizes EV charging capacity utilization and minimizes charging infrastructure size and cost. The power arrangement minimizes the total time for charging the fleet. In an example, the power arrangement also uses historic and current data on the number of chargers and EVs, predict power distribution and uses distributed energy storage.

In a development, demand interface circuit of the power arrangement is configured for acquiring at least one demand data of a group comprising: an energy need that is required of an electric vehicle, a discharge energy that is available by the electric vehicle for discharging, a charging time period that is available for charging the electric vehicle and a discharging time period that is available for discharging the electric vehicle.

For example, the demand interface circuit is configured for acquiring: an energy need that is required of an electric vehicle, a discharge energy that is available by the electric vehicle for discharging, and a discharging time period that is available for discharging the electric vehicle.

The energy management arrangement is configured to control the power distribution arrangement such that a vehicle electrical power is provided at the vehicle power terminal as a function of the demand data and a building electrical power is provided at the building power terminal.

Advantageously, the vehicle electrical power provided at the vehicle power terminal depends on the demand data and thus the demand of a load connected to the vehicle power terminal can be fulfilled.

In a development of the power arrangement, the energy management arrangement is configured to calculate for the electric vehicle: an initial charging power as a ratio of the energy need to an available time period, and an initial discharge power as a function of the discharge energy and the discharging time period.

In a development of the power arrangement, the demand interface circuit is configured for acquiring a charging time period that is available for charging the electric vehicle.

In a development of the power arrangement, the electric vehicle is an electric vehicle arrived at a charger. The electric vehicle is, e.g., connected to the charger. The charger is coupled to the vehicle power terminal. Thus, the electric vehicle can be named "arrived electric vehicle." The energy need is the energy that is needed for charging the electric vehicle (for fully charging or partially charging the battery of the electric vehicle) according to the input of the driver or owner of the electric vehicle. The charging time period is the maximum period which can be used for charging the energy need into the electric vehicle. The discharge energy is the energy which the driver or owner of the car is willing to provide to the power distribution arrangement in order to minimize peaks of power demands. The discharging time period is the maximum period which can be used for discharging the discharge energy from the electric vehicle to the power distribution arrangement.

In a development of the power arrangement, the building electrical power is also a function of the demand data.

In a development of the power arrangement, the demand interface circuit additionally acquires an arrival time of the electric vehicle. The arrival time is the point of time at which the electric vehicle arrives at the charger or is connected to the charger.

In a development of the power arrangement, the demand interface circuit additionally acquires a limit charger capacity of the electric vehicle. The limit charger capacity may be named as an electric vehicle charging capacity. The limit charger capacity is the maximum power that can be received by an electric vehicle. Since the electric vehicles are different, the limit charger capacity may also be different.

In a development of the power arrangement, the demand data include the energy need and the charging time period. In case the power distribution arrangement and/or the charger is not configured to receive electrical power from an electric vehicle, the demand data does not include discharge parameters such as, e.g., the discharge energy and the discharging time period.

In an alternative development of the power arrangement, the demand data includes the energy need, the charging time period, the discharge energy and the discharging time period.

In a development of the power arrangement, the energy management arrangement calculates an available time period which is available for the electric vehicle depending on the arrival time of the electric vehicle, the discharging time period, the charging time period and a value of a current point of time. Thus, the available time period is not constant; it decreases with time. In case the power distribution arrangement and/or the charger is not configured to receive electrical power from an electric vehicle, the discharging time period is zero.

In a development of the power arrangement, the energy management arrangement calculates the available time period additionally depending on a priority level of the electric vehicle.

In a development of the power arrangement, the energy management arrangement calculates the available time period at the current point of time according to the following equation:

$$TAV=ta+TD+TC/PL-t,$$

wherein TAV is the time period available, ta is the arrival time of the electric vehicle, TD is the discharging time period, TC is the charging time period, PL is the priority level and t is the value of the current point of time. The priority level can be set to one, in case each of the electric vehicles has the same priority level. In case the electric vehicles have different priority levels: $PL \geq 1$.

In a development of the power arrangement, the energy management arrangement stops charging the electric vehicle in case at least one of following two conditions is fulfilled:

$$TAV < \Delta t,$$

$$EN \leq 0,$$

wherein TAV is a value of the available time period, $\Delta t$ is a value of a time slot and EN is a value of the energy need at the current point of time. A time slot can also be named time step. The available time period decreases with time (or the number of time slots). The energy need decreases by providing a charging power to the electric vehicle and increases in case of a discharge power being gained from the electric vehicle.

In a development of the power arrangement, the energy management arrangement calculates for the electric vehicle at least one value of a group comprising:

an initial charging power as a function of the energy need and of the charging time period, an initial discharge power as a function of the discharge energy and the discharging time period, an instantaneous power need as a function of the energy need, and an instantaneous discharge power as a function of the discharge energy.

In a development of the power arrangement, the energy management arrangement calculates for the electric vehicle a discharge capacity as a function of the initial discharge power, a limit discharge capacity and the instantaneous discharge power.

In a development of the power arrangement, the energy management arrangement calculates for the electric vehicle the initial charging power as function of the energy need and the available time period. The initial charging power is, e.g., a ratio of the energy need to the available time period.

In a development of the power arrangement, the energy management arrangement calculates for the electric vehicle the initial charging power and the instantaneous power need. In case the power distribution arrangement and/or the charger is configured to receive electrical power from an electric vehicle, the initial discharge power and the instantaneous discharge power are additionally calculated.

In a development, an arrangement comprises the power arrangement. The arrangement comprises a number N of chargers that are coupled to the vehicle power terminal. A number M of electric vehicles is arrived at the number N of chargers. The number N of chargers is equal or larger than the number M of electric vehicles.

In a development of the power arrangement, the energy management arrangement calculates a total initial charging power for the number M of electric vehicles. The total initial charging power is the sum of the initial charging power of the number M of electric vehicles.

In a development, the power arrangement comprises a supply interface circuit coupled to the energy management arrangement. The supply interface circuit provides supply data to the energy management arrangement. The energy management arrangement controls the power distribution arrangement such that the vehicle electrical power and/or the building electrical power are provided at the vehicle power terminal and at the building power terminal respectively, additionally as a function of the supply data received at the supply interface circuit.

In a development of the power arrangement, the supply interface circuit acquires at least one supply data of a group comprising a present grid utility capacity, a present photovoltaic capacity, a present battery capacity and a present diesel generator capacity. The present grid utility capacity and/or the present diesel generator capacity may be constant. The present photovoltaic capacity depends on the light conditions at the current point of time. The present battery capacity depends on the charging state of the battery at the current point of time.

In a development of the power arrangement, the energy management arrangement calculates a total power supply using the supply data. For example, the total power supply is the sum of the capacities of each of the sources for electric power which are coupled to the power distribution arrangement. Depending on circumstance, there may be one source such as, e.g., a grid utility, two sources such as, e.g., a photovoltaic device and a battery or more than two sources. The photovoltaic device may be named solar photovoltaic device or cell.

In a development of the power arrangement, the energy management arrangement calculates a value of a supply power of the electric vehicle charger infrastructure as a function of the total power supply, a building load and a capacity of the electric vehicle charger infrastructure. The energy management arrangement calculates the value of the supply power (SPO) of the electric vehicle charger infrastructure, e.g., by the equation:

$$SPO = \text{minimum}\{(TPS-BL); CAP\},$$

wherein TPS is a value of the total power supply, BL is a value of the building load and CAP is a value of the capacity of the electric vehicle charger infrastructure.

In a development of the power arrangement, the energy management arrangement calculates at least one of:

a total charger capacity as a sum of a charger capacity of the number M of the electric vehicles (that means of the electric vehicles which receive electric power via the vehicle power terminal), and a total discharge capacity as a sum of a discharge capacity of the number M of the electric vehicles (that means of the electric vehicles which provide electric power via the vehicle power terminal to the power distribution arrangement).

In a development of the power arrangement, the charger capacity of an electric vehicle of the number M of electric vehicles is a function of a limit charger capacity of the electric vehicle and the instantaneous power need of the electric vehicle. The charger capacity of the electric vehicle is a minimum of the limit charger capacity and the instantaneous power need.

In a development of the power arrangement, the discharge capacity of an electric vehicle of the number M of electric vehicles is a function of a limit discharge capacity of the electric vehicle and the instantaneous discharge power of the electric vehicle or a function of the initial discharge power of the electric vehicle, the limit discharge capacity of the electric vehicle and the instantaneous discharge power of the electric vehicle. The discharge capacity of the electric vehicle is a minimum of the limit discharge capacity and the instantaneous discharge power or is a minimum of the initial discharge power, the limit discharge capacity and the instantaneous discharge power.

In a development of the power arrangement, the energy management arrangement calculates an excess charging capacity depending on the total charger capacity and the supply power of the electric vehicle charger infrastructure. The energy management arrangement calculates a value of the excess charging capacity (ECC), e.g., using the equation:

$$ECC = \text{Maximum}\{(TCC-SPO), 0\}$$

wherein TCC is a value of the total charger capacity and SPO is a value of the supply power of the electric vehicle charger infrastructure.

In a development of the power arrangement, the energy management arrangement increases a scaled discharge power for an electric vehicle of the number of electric vehicles depending on the excess charging capacity. Advantageously, in case of a high excess charging capacity, the discharge power can be increased.

In a development of the power arrangement, the energy management arrangement calculates a discharge power depending on scaled discharge power and the discharge capacity.

In a development of the power arrangement, the energy management arrangement calculates a total discharge power as a sum of the discharge power of the number M of electric vehicles.

In a development of the power arrangement, the energy management arrangement calculates a total managed power depending on the total discharge power and the supply power of the electric-vehicle charger-infrastructure.

In a development of the power arrangement, the energy management arrangement calculates a possible charging power depending on an initial charging power and the total managed power.

In a development of the power arrangement, the energy management arrangement calculates a charging power depending on the possible charging power and the charger capacity.

In a development of the power arrangement, the energy management arrangement calculates an excess capacity of the electric vehicle as difference between a charge capacity of the electric vehicle and a charging power of the electric vehicle at the current point of time. In an example, the excess capacity is only calculated for an electric vehicle that is charged at the current point of time or has to be charged in the next time slot. The charge capacity is, e.g., the minimum of the limit charger capacity and the instantaneous power need. The limit charger capacity is the minimum of the upper value of electrical power which can be provided by a charger connected to the electric vehicle and of the upper value of electrical power which can be received by the electric vehicle. The charging power is the electrical power that is applied to the electric vehicle during the time slot at the current point of time. The charging power that is applied to the electric vehicle during the time slot can also be named final charging power.

In a development of the power arrangement, the energy management arrangement calculates an additional charging power of the electric vehicle depending on the excess capacity of the electric vehicle and depending on a sum of the excess capacities of the number M of electric vehicles. The additional charging power of the electric vehicle is calculated by dividing the excess capacity of the electric vehicle through the sum of the excess capacities of the number M of electric vehicles. In an example, the energy management arrangement calculates the additional charging power of the electric vehicle depending on the excess capacity of the electric vehicle, a sum of the excess capacities of the number M of electric vehicles and an available additional charging power. In an example, the result of this division is multiplied by the available additional charging power to calculate the additional charging power. Typically, the available additional charging power has the unit W or kW. To calculate the additional charging power, the excess capacity is scaled-up using the available additional charging power.

In a development of the power arrangement, the energy management arrangement calculates the available additional charging power which depends, e.g., on the total managed power, the total charger capacity and the sum of the charging power for the number M of EVs connected.

In a development of the power arrangement, the energy management arrangement increases a final charging power of the electric vehicle by the additional charging power. In an alternative example, the energy management arrangement calculates the final charging power of the electric vehicle for the next time slot by adding the charging power at the current point of time and the additional charging power. The additional charging power is positive or negative.

In a development of the power arrangement, explained in other words, the energy management arrangement calculates a next charging power of the electric vehicle for the next time slot by adding the charging power at the current point of time and the additional charging power. Correspondingly, the charging power of the present time slot has been calculated by adding the charging power of the previous time slot and the additional charging power calculated during the previous time slot. The charging power is constant during a time slot. The charging power is changed at the transition from a time slot to the next time slot in case the value of the additional charging power is not zero.

In a development of the power arrangement, the energy management arrangement calculates the energy need at the end of a time slot. The energy need at the end of a time slot is equal to the energy need at the end of the previous time slot minus the product of the charging power during the present time slot and the duration of the present time slot. The durations of the time slots are, e.g., equal.

In a development of the power arrangement, the power arrangement comprises a power meter interface circuit that is coupled to the energy management arrangement. The power meter interface circuit receives data about the vehicle electrical power provided via the vehicle power terminal and data about the building electrical power provided via the building power terminal. The energy management arrangement controls the power distribution arrangement, e.g., additionally as a function of measured data received at the power meter interface circuit.

In a development of the power arrangement, the power arrangement comprises a vehicle power meter that is arranged between the power distribution arrangement and the vehicle power terminal and is coupled to the power meter interface circuit. Moreover, the power arrangement comprises a building power meter that is arranged between the power distribution arrangement and the building power terminal and is coupled to the power meter interface circuit.

In a development of the power arrangement, the energy management arrangement comprises a memory storing at least one of a building load profile and a power supply profile.

In a development of the power arrangement, the memory stores at least one of a number of chargers and a power rating of each charger.

In a development, a building arrangement comprises the power arrangement and appliances of at least one of a group comprising household appliances, office appliances, fabrication appliances and retail appliances. The electrical power is provided to the appliances inside the building arrangement by the power arrangement. The number of buildings of the building arrangement is one or larger than one.

There is provided a method for providing electrical power which comprises providing demand data via a demand interface circuit to an energy management arrangement. The demand data include at least one data of a group comprising: an energy need that is required of an electric vehicle, a discharge energy that is available by the electric vehicle for discharging, a charging time period that is available for charging the electric vehicle and a discharging time period that is available for discharging the electric vehicle. Moreover, the method comprises controlling a power distribution arrangement by the energy management arrangement, providing vehicle electrical power to a vehicle power terminal by the power distribution arrangement, and providing building electrical power to a building power terminal by the power distribution arrangement. The energy management arrangement controls the power distribution arrangement such that the vehicle electrical power is provided at the vehicle power terminal as a function of the demand data.

Advantageously, the method optimizes the electrical power available and the time periods available to charge at least one electric vehicle and to provide electrical power to a building arrangement.

In a development of the method, the energy management arrangement calculates for the electric vehicle: an initial charging power as a ratio of the energy need to an available time period, and an initial discharge power as a function of the discharge energy and the discharging time period.

The method for providing electrical power is performed on-line. The method operates in real-time.

In a development of the method, the demand data further include an arrival time of the electric vehicle.

There is provided a computer program product comprising instructions to cause the power arrangement described above to execute the steps of the method described above.

The power arrangement and the computer program product described above are particularly suitable for the method for providing electrical power. Features described in connection with the power arrangement and the computer program product can therefore be used for the method and vice versa.

In a development, the arrangement implements a system and a methodology for EV fleet charging using a power distribution algorithm for an electric vehicle charging infrastructure, abbreviated EVCI. EV is the abbreviation for electric vehicle.

In a development, an EV fleet charging arrangement should meet daily EV charging needs in desired time. A power distribution algorithm in the energy management system (abbreviated EMS) distributes power across the plugged-in EVs to meet their daily charging need within the desired time duration while minimizing the installed power supply and EV charging capacity. The algorithm also leverages the vehicle-to-grid (abbreviated V2G) capability of certain vehicles to minimize the overall fleet charging duration and peak-demand expense.

A fleet of EVs which need to charge themselves uses a fleet charging system. This system may be sized for the worst-case scenario, i.e. when all EVs are plugged-in and are drawing maximum power as per the EV charger rating. This requires huge power capacity for the charging infrastructure, leading to huge installation, operational and maintenance costs. The power arrangement described here aims at avoiding these draw backs.

In a development, the power arrangement utilizes inputs on a number of chargers and power rating of each charger, number of EVs, energy need of each EV, EV arrival and departure time scheduled, total power supply profile including solar photovoltaic, diesel generator set and battery energy storage as well as a building load profile. The power arrangement determines the optimum power distribution among EVs. The power arrangement maximizes EV charging capacity utilization and minimizes charging infrastructure size and cost. The power arrangement minimizes the total time for charging the fleet. In an example, the power arrangement also uses historic and current data on the number of chargers and EVs, predict power distribution and uses distributed energy storage.

The following description of figures of embodiments shall further illustrate and explain aspects of the power arrangement and the method for providing electrical power. Parts, components and signals with the same structure and the same effect, respectively, appear with equivalent reference symbols. Insofar as parts, components and signals correspond to one another in terms of their function in different figures, the description thereof is not repeated for each of the figures.

FIG. 1 shows an exemplary embodiment of an arrangement 10 comprising a power arrangement 11. The power arrangement 11 includes an energy management arrangement 12 and a power distribution arrangement 13. The power distribution arrangement 13 is coupled to the energy management arrangement 12. Additionally, the power arrangement 11 comprises a demand interface circuit 14 that is coupled to the energy management arrangement 12. A supply interface circuit 15 of the power arrangement 11 is additionally coupled to the energy management arrangement 12. Furthermore, the power arrangement 11 comprises a power meter interface circuit 16 coupled to the energy management arrangement 12. The power arrangement 11 comprises a memory 17 coupled to the energy management arrangement 12.

The energy management arrangement 12 is realized, e.g., by a computer, microprocessor, microcontroller or a programmable logic or a combination of these devices. The power distribution arrangement 13 is fabricated, e.g., as an electrical enclosure or a switchboard. The power distribution arrangement 13 includes at least one of a circuit breaker 19, a fuse and a switch.

The power distribution arrangement 13 is coupled on its output side to a vehicle power terminal 21 and a building power terminal 30. The vehicle power terminal 21 is realized, e.g., as an output terminal or as an output/input terminal. Thus, the vehicle power terminal 21 is configured for a unidirectional flow of electrical power from the power distribution arrangement 13 via the vehicle power terminal 21 to another part or is configured for a bidirectional flow of electrical power to and from the power distribution arrangement 13. The building power terminal 30 is realized, e.g., as an output terminal or as an output/input terminal. Thus, the building power terminal 30 is configured for a unidirectional flow of electrical power from the power distribution arrangement 13 via the building power terminal 30 to a further part or is configured for a bidirectional flow of electrical power to and from the power distribution arrangement 13.

The power distribution arrangement 13 is coupled on its input side to at least one power source. The power sources shown in FIG. 1 are only shown as examples. The power distribution arrangement 13 is coupled to at least one source out of a group of sources which comprise, for example, a utility grid 40, a diesel generator set 42, a battery 43, and a photovoltaic device 44. The arrangement 10 includes a transformer 41 that couples the utility grid 40 to the power distribution arrangement 13. The at least one source is also connected to the supply interface circuit 15. Each of the sources available in the arrangement 10 is connected to the supply interface circuit 15.

The power distribution arrangement 13 provides a vehicle electrical power PVE at the vehicle power terminal 21 and a building electrical power PBU at the building power terminal 30.

Additionally, the arrangement 10 comprises a vehicle power meter 24 that is coupled to the vehicle power terminal 21. The arrangement 10 comprises a charger 22 for an electric vehicle. The charger 22 includes, e.g., a wall-box. The charger 22 is configured for charging an electrical vehicle 25. For example, the arrangement 10 includes a number N of chargers 22. The number N of chargers 22 form an electric charging station 23. The vehicle power meter 24 is coupled between the vehicle power terminal 21 and the number N of chargers 22. A fleet 26 of electric vehicles 25 can be charged by the number N of chargers 22. The vehicle power meter 24 measures the vehicle electrical power PVE provided via the vehicle power terminal 21 to the number N of chargers 22. For example, the vehicle power meter 24 provides a sum of the electrical power applied to the number N of chargers 22 or provides the values of electrical power for each of the number N of chargers 22 separately. Measured data SM of the vehicle electrical power PVE are transferred from the vehicle power meter 24 via the power meter interface circuit 16 to the energy management arrangement 12.

Correspondingly, the arrangement 10 comprises a building power meter 32 that is coupled to the building power terminal 30. The arrangement 10 includes a building arrangement 31. The building arrangement 31, e.g., includes exactly one building or includes several buildings. The building arrangement 31 is coupled via the building power meter 32 to the building power terminal 30. The building power meter 32 measures the building electrical power PBU provided to the building arrangement 31 as a sum or measures values of electrical power provided to different consumers inside the building arrangement 31 separately. The building power meter 32 generates the measured data SM, e.g., for each of the several buildings, for each flat or for each shop inside the building arrangement 31 separately. The building power meter 32 transfers the measured data SM via the power meter interface circuit 16 to the energy management arrangement 12.

The connection lines, drawn in FIG. 1 as bold lines, are electrical connection lines for providing electrical power. The connection lines, drawn as bold lines, are realized as single electrical connection lines. Alternatively, the connection lines are realized as several connection lines running parallel. Thus, one connection line may include a bundle of connections lines. For example, the connection line running from the power distribution arrangement 13 via the vehicle power terminal 21 and the vehicle power meter 24 to the number N of chargers 22 includes a number N of connection lines. Thus, each of the number N of chargers 22 is supplied with electrical power by a separate connection line. Also, the connection of the power distribution arrangement 13 via the building power terminal 30 and the building power meter 32 to the building arrangement 31 may include a further number L of connection lines, for example for connecting the power distribution arrangement 13 to several separate buildings of the building arrangement 31 or to several flats or stores inside the building arrangement 31.

The connections, shown as dashed lines in FIG. 1, are connections for providing data. Additionally, these connections which are drawn as dashed lines can also provide, e.g., electrical power, for example to operate the demand interface circuit 14, the supply interface circuit 15, the power meter interface circuit 16, the building power meter 32 and the vehicle power meter 24. The connections drawn as dashed lines are realized using wires or are realized in wireless form. These connections can be implemented as bus lines.

Additionally, the power arrangement 11 comprises a building interface circuit 33 that is connected to the energy management arrangement 12 and to the building arrangement 31. The building interface circuit 33 receives data from the building arrangement 31 and/or sends data to the building arrangement 31. The building interface circuit 33 can be used to provide demand data from a user or an appliance in the building arrangement 31 to the energy management arrangement 12 or to provide data such as control data from the energy management arrangement 12 to the building arrangement 31 such as, for example, to an appliance inside the building arrangement 31. For example, the energy management arrangement 12 is coupled via the building interface circuit 33 to a washing machine in the building arrangement 31 to start the washing machine. The energy management arrangement 12 controls the power distribution arrangement 13, e.g., additionally as a function of data received at the building interface circuit 33.

Additionally, the arrangement 10 comprises a central unit 50 that is connected to the energy management arrangement 12. The central unit 50 includes a computer. The central unit 50 is configured, e.g., for billing consumers. Thus, the central unit 50 generates, e.g., at least a bill 51, for example to the owner of the one of the electric vehicles 25 receiving energy at the charger 22.

The energy management arrangement 12 receives supply data SU via the supply interface circuit 15. The supply data SU contain information about an electric power that is supplied or can be supplied from one of the power sources such as the utility grid 40, the diesel generator set 42, the battery 43 and the photovoltaic device 44.

The energy management arrangement 12 receives data that are demand data SD via the demand interface circuit 14. The demand data SD include an arrival time tA of the electric vehicle 25 at one of the chargers 22. The demand data SD comprise, for example, an energy need EN that is required of the electric vehicle 25 and a charging time period TC that is available for charging the electric vehicle 25. In an example, the demand data additionally include, for example, a discharge energy ED that is available by the electric vehicle 25 for discharging and a discharging time period TD that is available for discharging the electric vehicle 25.

The demand data SD can be supplied by a user, for example a driver or owner of the electric vehicle 25, at the charger 22. For example, the charger 22 includes a display, touchscreen or another input device to receive the above-mentioned data from the driver or owner of the electric vehicle 25 that has to be charged at the charger 22. Alternatively, the demand data SD or a part of the above-mentioned demand data SD are provided from the electric vehicle 25 with a connection such as, for example, a wireless connection of the electric vehicle 25 to the charger 22 or directly to the demand interface circuit 14. Alternatively, the driver or owner of the electric vehicle 25 provides the above-mentioned data via a portable device such as a smartphone, tablet or computer, to the charger 22 or directly to the demand interface circuit 14.

The demand interface circuit 14 is realized, e.g., as a bus interface that is connected to the number N of chargers 22, as a device with an antenna to receive data from the number N of chargers 22 or from a portable device of a person such as a driver or owner of the electric vehicle 25 using wireless transmission or as an input/output device which can be used by such a person.

The energy management arrangement 12 uses the demand data SD and the supply data SU with information about the energy sources to generate control signals SC that are provided to the power distribution arrangement 13. The power distribution arrangement 13 provides the vehicle electrical power PVE at the vehicle power terminal 21 and the building electrical power PBU at the building power terminal 30 depending on the control signals SC generated by the energy management arrangement 12.

Additionally, the energy management arrangement 12 uses the measured data SM provided by the vehicle power meter 24 and/or the building power meter 32. The memory 17 stores a power supply profile, for example a power supply profile of the photovoltaic device 44. Moreover, the memory 17 stores, e.g., a building load profile of the building arrangement 31. The building load profile is generated by using daily, weekly or monthly load profiles of the building arrangement 31 in the past. In an example, the energy management arrangement 12 generates the control signals SC to the power distribution arrangement 13 also as a function of the building load profile and/or the power supply profile. Thus, not only the actual data of the electrical power provided at the vehicle power terminal 21 and at the building power terminal 30 are used for generating the control signals SC, but also the typical time characteristics on the supply side and on the consumer side.

In a development, the arrangement 10 and the method or methodology for EV fleet charging described maximizes EV charging capacity utilization and minimizes charging infrastructure size. The arrangement 10 of power distribution from energy sources to EV and back is shown in FIG. 1. The power distribution arrangement 13 and the energy management arrangement 12 are at the core of the arrangement 10 for EV charging and building-energy-management. This core, namely the power arrangement 11, exchanges power, information/sensing and control with: i) utility grid supply, ii) distributed energy resources (abbreviated DERs) namely solar photovoltaic, battery energy storage system (abbreviated BESS) and diesel generator set, iii) building loads, and iv) EV chargers 22. The power meters 24, 32 measure the power flow to/from EV chargers 22 and building loads respectively. The energy management arrangement 12 controls the power distribution based on: i) inputs sensed by these power meters 24, 32 and ii) parameters measured by the power distribution arrangement 13.

In an embodiment, the power arrangement 11 includes the vehicle power meter 24. Thus, the vehicle power meter 24 is arranged between the power distribution arrangement 13 and the vehicle power terminal 21. Similarly, the building power meter 32 is implemented, e.g., inside of the power arrangement 11. Thus, the building power meter 32 couples the power distribution arrangement 13 to the building power terminal 30. Alternatively, the building power meter 32 and the vehicle power meter 24 are included inside the power distribution arrangement 13.

In an embodiment, the power arrangement 11 is realized inside one of the buildings of the building arrangement 31.

Figure 2B:
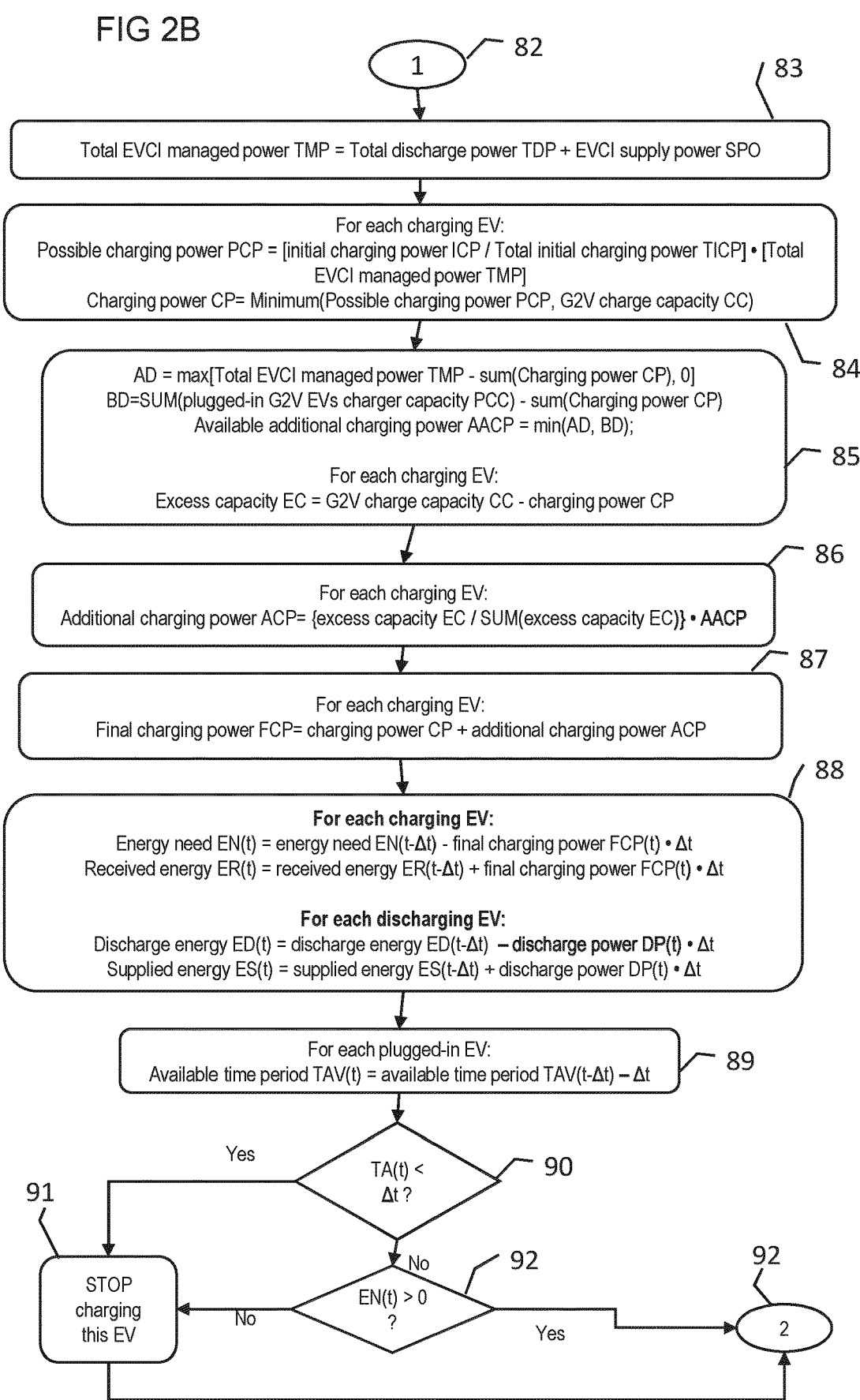

FIGS. 2A to 2C show an exemplary embodiment of a method performed by the embodiment of the power arrangement 11 as shown in FIG. 1. FIGS. 2A to 2C illustrate the power distribution method or algorithm. The method is illustrated in a flow chart with steps or nodes 70 to 97. Some of the steps are explained in detail in the following.

Step 70: The energy management arrangement 12 operates using time slots. A time slot can be implemented as time step. A time slot lasts for a time period $\Delta t$. A value of $\Delta t$ is, e.g., ¼ h, ⅙ h or ¹⁄₁₀ h. In case the time slot $\Delta t$ is given in fractions of an hour, an energy (measured in kWh) flowing during a time slot can easily be calculated (energy=electrical power·$\Delta t$). In case the time slot $\Delta t$ is measured in minutes, a conversion of units is performed at some calculations. In an example, $\Delta t$=15 min or 5 min.

Step 72: For each electrical vehicle 25, abbreviated EV, demand data SD such as an arrival time tA, an energy need EN (also named charging energy need), a discharge energy ED (which is a discharging energy available in the electrical vehicle 25), and a charging time period TC (which is the time available for charging) are determined, e.g. from inputs of the owner or driver of the EV 25. The charging time period TC is constant (and is provided by the driver or owner of the EV 25). A further demand data SD, namely a discharging time period TD, may also be determined. The discharge energy ED has a first value ED(tA) and the energy need EN also has a first value EN(tA) at the arrival time tA. The discharge energy ED and the energy need EN are a function of the point of time t and are both reduced from their first values during the time t.

Step 73: Each EV 25 has a priority number or priority level PL. The charging time period TC is scaled down by the priority number PL to reduce the charging time period TC as per priority value PL. In an example, the EVs 25 are grouped into multiple categories of priority, e.g., high, medium, and low, which is identified by the priority number PL. Thus, low priority has, e.g., PL=1, while PL=2 and PL=1.5 are for high and medium priority respectively.

G2V is the abbreviation for grid to vehicle and V2G is the abbreviation for vehicle to grid. G2V and V2G are sometimes part of the names to indicate the direction of electrical power flow. However, the names without G2V and V2G have the same meaning as the names including G2V and V2G. Also, EVCI (electric vehicle charging infrastructure is abbreviated as EVCI) is included sometimes in the names to indicate that the signal or quantity refers to the arrangement 10 and not only to one electric vehicle 25 and one charger 22. The EVCI is realized by the power arrangement 11 and the number N of chargers 22.

Typically, the electric vehicle 25 is first discharged and then charged, in case the discharge energy ED is set larger than zero. In case the discharge energy ED is zero (e.g. the initial discharge energy ED(tA) or the present discharge energy ED(t) is zero), the electric vehicle 25 is charged and not discharged.

Step 75: For each EV 25, for every time slot or time step $\Delta t$ (also described as 't'), an initial charging power ICP is calculated as a ratio of the energy need EN (which may be named charging energy need EN) to the available time period TAV at the given point of time t. The available time period TAV is not constant and is reduced as a function of time. An initial discharge power IDP and a total initial charging power TICP are also calculated.

The instantaneous power need IPN is the power needed over one time slot $\Delta t$ to deliver the remaining charging energy need EN of that G2V EV 25. In other words, for providing the remaining energy need EV to the electric vehicle 25, hypothetically the instantaneous power need IPN has to be provided to the electric vehicle 25. The instantaneous power need IPN can be calculated using:

$$IPN = EN/\Delta t$$

wherein EN is a value of the present energy need at the point of time t and $\Delta t$ is a value of the time slot. For $\Delta t$ given in minutes, the following equation can be used: $IPN=EN\cdot 60/\Delta t$ The instantaneous discharge power IPD or instantaneous power discharge need is the power discharge over time slot $\Delta t$ to take all the remaining available discharge energy ED of that V2G EV 25. In other words, for discharging the remaining discharge energy ED from the electric vehicle 25 to the power distribution arrangement 13 during one time slot $\Delta t$, hypothetically the instantaneous discharge power IPD has to be taken from the electric vehicle 25. The instantaneous discharge power IPD can be calculated using:

$$IPD=ED/\Delta t \text{ or}$$

$$IPD=ED\cdot 60/\Delta t \text{ (in case } \Delta t \text{ is given in minutes)}$$

wherein ED is a value of the present discharge energy at the point of time t and $\Delta t$ is the value of the time slot.

Step 77: For the arrangement 10 (or the building arrangement 31), a total power supply TPS is the sum of: i) an utility power supply, and ii) sum of power from distributed energy resources (abbreviated DER, e.g. from a battery energy storage system abbreviated BESS with the battery 43, and/or a photovoltaic device or arrangement 44 and/or the diesel generator set 42). The energy management arrangement 12 uses the supply data SU received via the supply interface circuit 15 and power supply profiles (e.g. the power supply profile of the photovoltaic device 44) stored in the memory 17 to calculate the total power supply TPS.

An EVCI supply power SPO is calculated as the difference between: i) total power supply TPS, and ii) a building load BL (power consumption of building arrangement 31). However, the EVCI supply power SPO is limited to an EVCI capacity CAP (also named EVCI installed capacity). A value for the building load BL is determined from the building load profile stored in the memory 17 or the measured data SM or a combination of both inputs.

Step 78: For every charging EV 25, onboard charger capacity (G2V charger capacity) is taken as a minimum of the given charger capacity and the instantaneous power need IPN. The given charger capacity is a limit charger capacity LCC. The limit charger capacity LCC is the minimum of the upper value of power which can be provided by the charger 22 and of the upper value of power which can be received by the electric vehicle 25. Thus, a charge capacity CC is the minimum of the limit charger capacity LCC and the instantaneous power need IPN.

Similarly, for every discharging EV 25, onboard discharge capacity (V2G charger capacity) is taken as a minimum of the given charger capacity and instantaneous discharge power IPD.

The given charger capacity is a limit discharge capacity LDC. The limit discharge capacity LDC is the minimum of the upper value of power which can be provided by the electric vehicle 25 and of the upper value of power which can be received by the charger 22 and the power distribution unit 13. Thus, the discharge capacity DIC is the minimum of the limit discharge capacity LDC and the instantaneous discharge power IPD. The limit discharge capacity LDC is, e.g., equal to the limit charger capacity LCC.

Alternatively, the discharge capacity DIC is the minimum of the initial discharge power IDP, the limit discharge capacity LDC and the instantaneous discharge power IPD.

Step 79: An excess charging capacity ECC is calculated as the difference between: i) a total G2V charger capacity TCC, and ii) the EVCI supply power SPO. If the difference is less than zero, then the excess charging capacity ECC is taken as zero.

Step 80: For every discharging EV 25, the V2G discharge capacity DIC is then scaled up or down such that a total V2G discharge capacity TDC matches the excess charging capacity ECC to obtain scaled discharge power. However, for each V2G charger 22 the scaled discharge power SDP is limited to V2G discharger capacity DIC as described in step 78 above.

Step 81: A total discharge power TDP from discharging EVs 25 (V2G EVs) is then calculated as a sum of a discharge power DP of the number M of vehicles 25.

As described in FIG. 2B:

Step 83: A total EVCI managed power TMP is the sum of: i) the EVCI supply power SPO, and ii) the total discharge power TDP (resulting from V2G EVs 25).

Step 84: For every charging EV 25, a possible charging power PCP is obtained by scaling up or down the initial charging power ICP, such that the total charging power for all charging EVs 25 matches the total EVCI managed power TMP. However, the charging power CP is limited to the minimum of the possible charging power PCP and the G2V charge capacity CC as calculated above. The charge capacity CC is calculated in step 78.

Step 85: A quantity AD is calculated as difference between the total EVCI managed power TMP and a total charging power which is the sum of the charging power CP for the number M of electric vehicles 25. If this difference is less than zero, then AD is taken as zero. A quantity BD is calculated as difference between a plugged-in charger capacity PCC (which can be named plugged-in G2V EVS charger capacity or total charging EV G2V charger capacity) and the total charging power which is the sum of the charging power CP for the number M of electric vehicles 25. An available additional charging power AACP is the minimum of the quantities AD and BD.

For each charging EV 25, an excess capacity EC is defined as difference between the G2V charge capacity CC and the charging power CP.

Step 86: For each charging EV 25, an additional charging power ACP is obtained by scaling up or down this excess capacity EC, such that a total excess capacity matches D. The total excess capacity is the sum of the excess capacity EC of the number M of electric vehicles 25.

Step 87: For each charging EV 25, a final charging power FCP is obtained by adding the charging power CP (as in step 84) and an additional charging power ACP. In an example, FCP=CP+ACP.

Step 88: For each charging EV 25, the energy need EN(t) is updated by deducting the energy charged during the time slot $\Delta t$ (for example the last time slot $\Delta t$ before the current point of time t). Also, the received energy ER(t) is updated by adding the energy charged during the time slot $\Delta t$. For each discharging EV 25, the discharge energy ED(t) (which is an energy to be discharged) is updated by deducting energy discharged during time slot $\Delta t$. Also, the supplied energy ES(t) is updated by adding the energy discharged during the time slot $\Delta t$. A received energy ER and a supplied energy ES are also calculated.

Step 89: For each plugged-in EV 25, the available time period TAV(t) is updated by deducting the value of one time slot $\Delta t$. For each electric vehicle 25, the charging is stopped if the available time period TAV(t) is less than $\Delta t$ and/or the energy need EN is less than zero (or a small positive residual value).

In FIG. 2C, the following steps are shown:

Step 94: EVCI utilization for the arrangement 10 is calculated as a ratio of total charging energy to the charging energy which the EVCI capacity can supply in 24 hours. For each EV 25, the energy bill 51 is calculated as the product of energy rate (price per kWh) and net energy received. Alternatively, the energy bill 51 is the difference between the price of energy purchased (G2V) and the price of energy sold (V2G).

Step 96: All above steps from point 3 (or step 75) onwards are repeated until each of the electric vehicles 25 is charged.

Advantageously, a data convergence can be achieved by the method shown in FIGS. 2A to 2C such that each arrived electric vehicle 25 is charged and the building load BL is fulfilled.

The arrangement 10 uses various input parameters and key performance indicators (KPIs) as output of the method:

The power arrangement 10 uses the following inputs:

Building load profile (kW Vs Time),

Energy cost or energy rate ($/kWh),

EVCI capacity (KW),

Utility capacity (KW) which is the amount of electrical power that can be provided by the grid 40 and the transformer 41.

Inputs for each EV 25 are:

Arrival time tA (hh:mm),

Charging time period TC which is the time available for charging (hours),

Discharging time period TD which is the time available for discharging (hours),

Energy need EN(tA) which is the energy needed (kWh) at the arrival time tA,

EV charging capacity (KW) which is also named limit charger capacity LCC. The limit charger capacity LCC is the minimum of the capacity of the EV to receive power from any charger 22 and of the capacity of the charger 22 to provide power.

These inputs are stored in the memory 17 and/or in the energy management arrangement 12.

Key performance indicators (abbreviated KPIs) are, e.g.:

EVCI managed power (KW)

EVCI capital expenditure (abbreviated CAPEX) and amortization of the capital expenditure ($)

EVCI utilization (%)

For each EV charger, KPIs are:

Charger Time: Charging and discharging (hours)

Individual Charger utilization (%)

Charger idle time (hours)

EV energy bill 51 ($)

Charger utilization (%)

Equations for calculating EVCI utilization, individual charger utilization and average charger utilization are given in FIG. 2C. The signals or quantities AD, BD, D, additional charging power ACP, building load BL, charge capacity CC, charging power CP, discharge capacity DIC, discharge power DP, excess capacity EC, excess charging capacity ECC, discharge energy ED, energy need EN, received energy ER, supplied energy ES, instantaneous power need IPN, instantaneous discharge power IPD, vehicle electric power PVE, building electric power PBU, possible charging power PCP, plugged-in charger capacity PCC, control signal SC, scaled discharge power SDP, measured data SM, supply power SPO, supply data SU, available time period TAV, total charger capacity TCC, total discharge capacity TDC, total initial charging power TICP, total discharge power TDP, total managed power TMP and total power supply TPS depend on the current point of time t. The dependency is sometimes indicated, e.g. in the case of EN(t) or TAV(t).

Only the signals or quantities initial charging power ICP, initial discharge power IDP, limit charger capacity LCC, limit discharge capacity LDC, priority level PL, demand data SD, arrival time tA, discharging time period TD and charging time period TC are constant and do not depend on the point of time t: however, these signals depend on the electric vehicle 25 and/or the charger 22 and can be different for different electric vehicles 25 or chargers 22 or different arrivals of the same electric vehicle 25 at different points of time t (e.g. at different days). The time slot Δt is constant.

The embodiments shown in FIGS. 1 to 2C as stated represent examples of the improved power arrangement 10; therefore, they do not constitute a complete list of all embodiments according to the improved power arrangement 10. Actual power arrangements may vary from the embodiments shown in terms of parts, devices and signals, for example.

REFERENCE NUMERALS

10 arrangement (also referred to herein as system)

11 power arrangement (also referred to herein as power system)

12 energy management arrangement (also referred to herein as energy management system)

13 power distribution arrangement (also referred to herein as a power distribution system)

14 demand interface circuit

15 supply interface circuit

16 power meter interface circuit

17 memory

19 circuit breaker

21 vehicle power terminal (vehicle power connection)

22 charger

23 electric charging station

24 vehicle power meter

25 electric vehicle

26 fleet

30 building power terminal (building power connection)

31 building arrangement (also referred to herein as a building system)

32 building power meter

33 building interface circuit

40 utility grid

41 transformer

42 diesel generator set

43 battery

44 photovoltaic device

50 central unit

51 bill

70 to 95 step

AACP available additional charging power

AD, BD quantity

ACP additional charging power

BL building load

CAP electric-vehicle charger-infrastructure capacity

CC charge capacity

CP, CP(t) charging power

DIC discharge capacity

DP discharge power

EC excess capacity

ECC excess charging capacity

ED discharge energy

EN, EN(t) energy need

ER, ER(t) received energy

ES, ES(t) supplied energy
FCP final charging power
ICP initial charging power
IDP initial discharge power
IPD instantaneous discharge power
IPN instantaneous power need
PBU building electric power
PVE vehicle electric power
LCC limit charger capacity
LDC limit discharge capacity
PCC plugged-in charger capacity
PCP possible charging power
PL priority level
SC control signal
SD demand data
SDP scaled discharge power
SM measured data
SPO supply power
SU supply data
t current point of time
TAV, TAV(t) available time period
tA arrival time
TC charging time period
TCC total charger capacity
TD discharging time period
TDC total discharge capacity
TDP total discharge power
TICP total initial charging power
TMP total managed power
TPS total power supply
$\Delta t$ time slot.

The invention claimed is:

1. An energy management system for controlling a power distribution system, the power distribution system being configured to couple to a vehicle power connection and a building power connection, being configured to control power flow to or from an electric vehicle through the vehicle power connection and to or from a building through the building connection, and comprising at least one of a circuit breaker, a fuse, or a switch, the energy management system comprising:

processing circuitry comprising at least one of a computer, a microprocessor, a microcontroller, programmable logic, or memory, the processing circuitry being configured such that the energy management system is configured to:

receive demand data, the demand data comprising:

an energy need, which defines energy that is required by the electric vehicle:

a discharge energy, which defines energy that is available by the electric vehicle for discharging:

a discharging time period, which is period of time available for discharging the electric vehicle; and a charging time period, which is a maximum period of time that is usable for charging the energy need into the electric vehicle:

calculate an available time period for the electric vehicle at a current point of time (t) according to:

$$TAV = tA + TD + TC/PL - t,$$

wherein tA is a value of an arrival time of the electric vehicle, TD is a value of the discharging time period, TC is a value of the charging time period, PL is a priority level, with $PL \geq 1$, and t is the current point of time:

calculate a charging power for the electric vehicle as a ratio of the energy need of the electric vehicle to the available time period;

determine a discharge power for the electric vehicle as a function of the discharge energy and the discharging time period;

control the power distribution system to provide vehicle electrical power at the vehicle power connection based on the demand data; and control the power distribution system to provide building electrical power at the building power connection.

2. The energy management system of claim 1, wherein energy management system is further configured to stop charging of the electric vehicle in case at least one of two conditions is fulfilled:

$$TAV < \Delta t, \text{ or}$$

$$EN \leq 0,$$

wherein TAV is a value of the available time period at the current point of time (t), $\Delta t$ is a value of a time slot, and EN is a value of the energy need at the current point of time (t).

3. The energy management system of claim 1, wherein the energy management system is further configured to calculate for the electric vehicle, at least one value of a group comprising:

an instantaneous power need based on the energy need; and an instantaneous discharge power based on the discharge energy.

4. The energy management system of claim 3, wherein the energy management system is further configured to calculate a discharge capacity for the electric vehicle based on the discharge power, a limit discharge capacity, and the instantaneous discharge power.

5. The energy management system of claim 3, wherein the vehicle power connection is configured to couple to a plurality of electric vehicles, the plurality of electric vehicles comprising the electric vehicle, wherein the power distribution system is further configured to control the power flow to or from the plurality of electric vehicles, and wherein the energy management system is further configured to calculate a total charging power for the plurality of electric vehicles, the total charging power being a sum of the charging power of each of the plurality of electric vehicles.

6. The energy management system of claim 1, wherein the power distribution system is further coupled to at least one power supply to receive supply power, wherein energy management system is further configured to receive supply data comprising data defining a capacity of the power supply, wherein controlling the power distribution system to provide electrical power at the vehicle power connection is further based on the supply data, and wherein controlling the power distribution system to provide building electrical power at the building power connection is further based on the supply data.

7. The energy management system of claim 6, wherein the power supply comprises one or more of a grid utility, a photovoltaic device, a battery, or a diesel generator, and the capacity of the power supply correspondingly comprises one or more of a present grid utility capacity, a present photovoltaic capacity, a present battery capacity, or a present diesel generator capacity.

8. The energy management system of claim 6, wherein the vehicle power connection is further configured to couple to the electric vehicle through an electric vehicle charger infrastructure (EVCI), the EVCI having an EVCI supply power and an EVCI capacity, and wherein the energy management system is further configured to calculate the EVCI supply power based on the supply data, a building load of the building, and the EVCI capacity.

9. The energy management system of claim 8, wherein the energy management system is further configured to:
calculate a total power supply using the supply data; and
calculate the EVCI supply power based on:

$$SPO=\text{minimum}\{(TPS{-}BL);CAP\},$$

wherein the SPO is a value of the EVCI supply power, TPS is a value of the total power supply, BL is a value of the building load, and CAP is a value of the EVCI capacity.

10. The energy management system of claim 9, wherein the vehicle power connection is further configured to couple to a plurality of electric vehicles through the EVCI, the plurality of electric vehicles comprising the electric vehicle, and
wherein the energy management system is further configured to calculate at least one of:
a total charger capacity as a sum of a charger capacity of the plurality of electric vehicles, wherein the charger capacity of one electric vehicle of the plurality of electric vehicles is based on a limit charger capacity of the one electric vehicle and an instantaneous power need of the electric vehicle, and
a total discharge capacity as a sum of a discharge capacity of the plurality of electric vehicles, wherein the discharge capacity of a selected electric vehicle of the plurality of electric vehicles is based on a limit discharge capacity of the selected electric vehicle and an instantaneous discharge power of the electric vehicle.

11. The energy management system of claim 10, wherein energy management system is further configured to:
calculate an excess charging capacity depending on the total charger capacity and the EVCI supply power;
increase a scaled discharge power for an electric vehicle of the plurality of electric vehicles depending on the excess charging capacity;
calculate the discharge power depending on the scaled discharge power and the discharge capacity;
calculate a total discharge power as a sum of the discharge power of the plurality of electric vehicles;
calculate a total managed power depending on the total discharge power and the EVCI supply power;
calculate a possible charging power depending on the charging power and the total managed power;
calculate a charging power depending on the possible charging power and the charger capacity;
calculate an excess capacity of the electric vehicle as difference between the charger capacity of the electric vehicle and the charging power of the electric vehicle at the current point of time;
calculate an additional charging power of the electric vehicle depending on the excess capacity of the electric vehicle, a sum of excess capacities of the plurality of electric vehicles, and an available additional charging power; and
increase a final charging power of the electric vehicle by the additional charging power.

12. The energy management system of claim 1, wherein the energy management system is further configured to:
receive vehicle measured data about the vehicle electrical power provided via the vehicle power connection and building measured data about the building electrical power provided via the building power connection; and
control the power distribution system to provide the building electrical power and the vehicle electrical power additionally based on the measured data.

13. The energy management system of claim 1, wherein the energy management system is further configured to receive building demand data from the building about a power demand of the building electrical power.

14. The energy management system of claim 13, wherein the energy management system is further configured to determine a first amount of electrical power provided to the vehicle power connection and a second amount of electrical power provided to the building power connection based on total electrical power available, the demand data, and the building demand data.

15. The energy management system of claim 1, wherein PL=1 represents low priority, PL=2 represents high priority, and PL=1.5 represents medium priority.

16. A method for controlling a power distribution system to control power flow to or from an electric vehicle and to or from a building, the method comprising
receiving demand data, the demand data comprising:
an energy need, which defines energy that is required by the electric vehicle;
a discharge energy, which defines energy that is available by the electric vehicle for discharging;
a discharging time period, which is period of time available for discharging the electric vehicle; and
a charging time period, which is a maximum period of time that is usable for charging the energy need into the electric vehicle:
calculating an available time period for the electric vehicle at a current point of time (t) according to:

$$TAV=tA{+}TD{+}TC/PL{-}t,$$

wherein tA is a value of an arrival time of the electric vehicle, TD is a value of the discharging time period, TC is a value of the charging time period, PL is a priority level, with PL≥1, and t is the current point of time:
calculating a charging power for the electric vehicle as a ratio of the energy need of the electric vehicle to the available time period;
determining a discharge power for the electric vehicle as a function of the discharge energy and the discharging time period;
controlling the power distribution system to provide vehicle electrical power to the electric vehicle through a vehicle power connection based on the demand data; and
controlling the power distribution system to provide building electrical power to the building through a building power connection.

17. The method of claim 16, wherein controlling the power distribution system to provide vehicle electrical power to the electric vehicle through the vehicle power connection is further based on the charging power of the electric vehicle.

18. The method of claim 17, wherein the method is further configured to control the power distribution system to control power flow to or from a plurality of electric vehicles, wherein the plurality of electric vehicles comprises the electric vehicle and a second electric vehicle, wherein the demand data further comprises a second energy need, which defines energy that is required by the second electric vehicle;

a second discharge energy, which defines energy that is available by the second electric vehicle for discharging;

a second discharging time period, which is period of time available for discharging the second electric vehicle; and a second charging time period, which is a maximum period of time that is usable for charging the second energy need into the second electric vehicle, wherein the method further comprises calculating a second available time period for the second electric vehicle at the current point of time (t) according to:

$$TAV2 = tA2 + TD2 + TC2/PL2 - t,$$

wherein tA2 is a value of an arrival time of the second electric vehicle, TD2 is a value of the second discharging time period, TC2 is a value of the second charging time period, PL2 is a second priority level, with $PL \geq 1$, and t is the current point of time, wherein the method further comprises determining a second discharge power for the second electric vehicle as a function of the second discharge energy and the second discharging time period, wherein controlling the power distribution system to provide the vehicle electrical power to the electric vehicle is further based on the second discharge power; and wherein the vehicle electrical power provided to the electric vehicle comprises power received from the second electrical vehicle.

19. A tangible, non-transitory computer readable storage medium comprising program instructions or logic, which when executed by one or more processors cause the processor to execute a method for controlling a power distribution system to control power flow to or from an electric vehicle and to or from a building, the method comprising receiving demand data, the demand data comprising:

an energy need, which defines energy that is required by the electric vehicle;

a discharge energy, which defines energy that is available by the electric vehicle for discharging;

a discharging time period, which is period of time available for discharging the electric vehicle; and a charging time period, which is a maximum period of time that is usable for charging the energy need into the electric vehicle:

calculating an available time period for the electric vehicle at a current point of time (t) according to:

$$TAV = tA + TD + TC/PL - t,$$

wherein tA is a value of an arrival time of the electric vehicle, TD is a value of the discharging time period, TC is a value of charging time period, PL is a priority level, with $PL \geq 1$, and t is the current point of time:

calculating a charging power for the electric vehicle as a ratio of the energy need of the electric vehicle to the available time period;

determining a discharge power for the electric vehicle as a function of the discharge energy and the discharging time period;

controlling the power distribution system to provide vehicle electrical power to the electric vehicle through a vehicle power connection based on the demand data; and controlling the power distribution system to provide building electrical power to the building through a building power connection.

* * * * *